(12) United States Patent
Da Deppo et al.

(10) Patent No.: US 10,040,406 B2
(45) Date of Patent: Aug. 7, 2018

(54) MULTI-POSITIONING OF A CAMERA OR OTHER SENSING DEVICE

(71) Applicant: Huf North America Automotive Parts Mfg. Corp., Milwaukee, WI (US)

(72) Inventors: Lynn D. Da Deppo, Bloomfield Hills, MI (US); Ehab Kamal, Novi, MI (US); Steve Bauer, Clarkston, MI (US)

(73) Assignee: Huf North America Automotive Parts Manufacturing Corp., Milwaukee, WI (US)

(*) Notice: Subject to any disclaimer, the term of this patent is extended or adjusted under 35 U.S.C. 154(b) by 218 days.

(21) Appl. No.: 14/575,712

(22) Filed: Dec. 18, 2014

(65) Prior Publication Data

US 2015/0183380 A1    Jul. 2, 2015

Related U.S. Application Data

(60) Provisional application No. 61/922,471, filed on Dec. 31, 2013.

(51) Int. Cl.
*B60R 11/04* (2006.01)
*H04N 7/18* (2006.01)
*B60R 11/00* (2006.01)

(52) U.S. Cl.
CPC ............. *B60R 11/04* (2013.01); *H04N 7/183* (2013.01); *B60R 2011/004* (2013.01)

(58) Field of Classification Search
CPC ... B60R 11/04; B60R 2011/004; B60R 11/00; B60R 1/00; B60R 2011/0049; B60R 2300/802; H04N 7/183

USPC ........................................ 348/148; 248/274.1
See application file for complete search history.

(56) References Cited

U.S. PATENT DOCUMENTS

| | | | | |
|---|---|---|---|---|
| 5,121,200 A | * | 6/1992 | Choi ......................... | B60R 1/00 348/148 |
| 2004/0036768 A1 | * | 2/2004 | Green ..................... | B60R 1/002 348/148 |
| 2006/0215020 A1 | * | 9/2006 | Mori ......................... | B60R 1/00 348/119 |
| 2006/0256459 A1 | * | 11/2006 | Izabel ..................... | B60R 11/04 359/872 |
| 2010/0040361 A1 | * | 2/2010 | Schuetz ................... | B60R 11/04 396/428 |
| 2010/0256875 A1 | * | 10/2010 | Gehin ..................... | E05F 15/73 701/49 |
| 2011/0181725 A1 | * | 7/2011 | Matsuura ............... | G03B 17/02 348/148 |
| 2012/0033078 A1 | * | 2/2012 | Huang ................... | B62D 13/06 348/148 |

(Continued)

FOREIGN PATENT DOCUMENTS

| | | | | |
|---|---|---|---|---|
| DE | 102008010966 A1 | * | 8/2009 | ............ B60R 11/04 |
| WO | WO 2008043931 A1 | * | 4/2008 | ............ E05F 15/43 |
| WO | WO 2010102237 A1 | * | 9/2010 | ............ B60J 5/101 |

*Primary Examiner* — Christopher S Kelley
*Assistant Examiner* — Kathleen Walsh
(74) *Attorney, Agent, or Firm* — Honigman Miller Schwartz and Cohn LLP; Matthew H. Szalach; Jonathan P. O'Brien

(57) ABSTRACT

A mechanism whereby a camera or other sensing type device is deployed into multiple positions as a result of inputs such as relative housing position, field of view assessment, and so forth to locate the device to allow an optimized position of the camera or sensor for the desired functionality.

29 Claims, 5 Drawing Sheets

(56) References Cited

U.S. PATENT DOCUMENTS

| | | | |
|---|---|---|---|
| 2013/0128039 A1* | 5/2013 | Meier | B60R 11/04 348/143 |
| 2013/0182112 A1* | 7/2013 | Liepold | B60R 11/04 348/148 |
| 2013/0193709 A1* | 8/2013 | Ravenscroft | E05F 3/14 296/57.1 |
| 2013/0207405 A1* | 8/2013 | Gruber | E05B 77/38 292/197 |
| 2014/0071279 A1* | 3/2014 | Mokashi | H04N 7/18 348/148 |
| 2014/0092249 A1* | 4/2014 | Freiburger | H04N 7/181 348/148 |
| 2014/0197649 A1* | 7/2014 | Hansen | B60R 11/04 292/336.3 |
| 2015/0054950 A1* | 2/2015 | Van Wiemeersch | B60R 1/00 348/148 |
| 2015/0275562 A1* | 10/2015 | Warburton | B60J 5/103 701/49 |

* cited by examiner

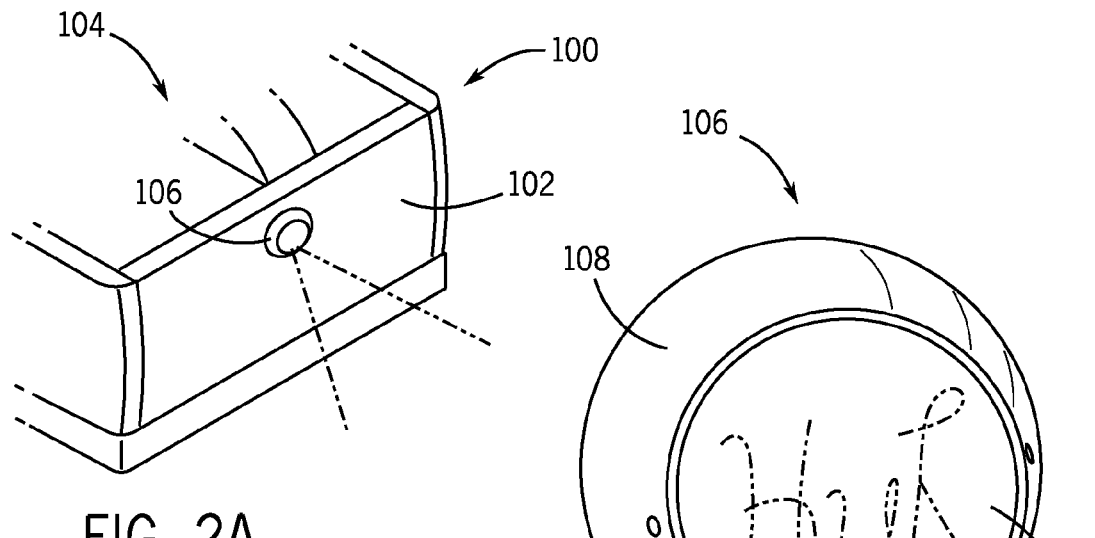
FIG. 2A
FIG. 2B
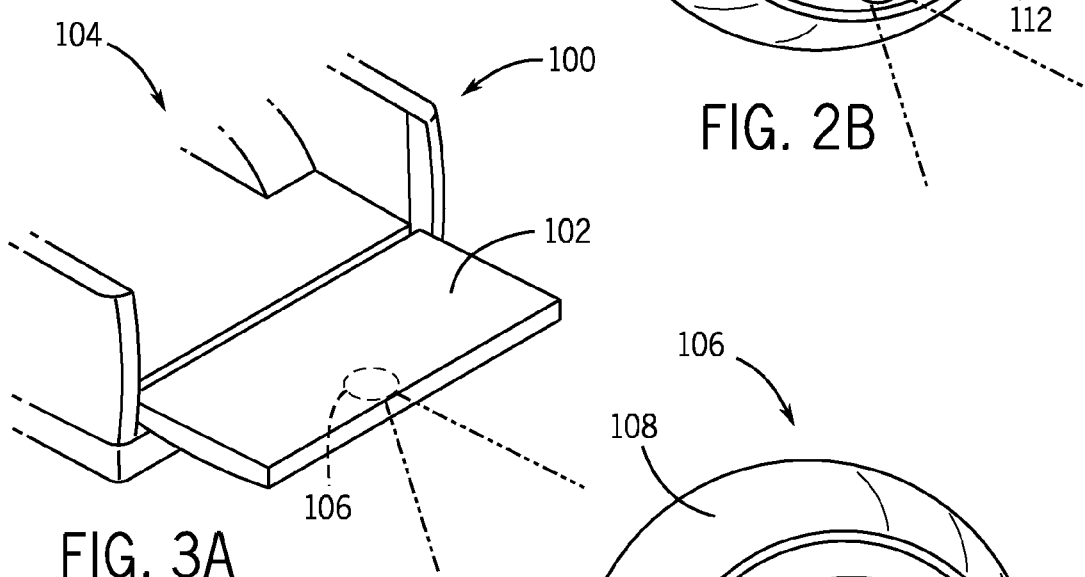
FIG. 3A
FIG. 3B

MULTI-POSITIONING OF A CAMERA OR OTHER SENSING DEVICE

CROSS-REFERENCE TO RELATED APPLICATIONS

This application claims the benefit of U.S. Provisional Patent Application No. 61/922,471 entitled "Multi-Positioning of a Camera or Other Sensing Device" filed on Dec. 31, 2013. The contents of that application are hereby incorporated by reference as if set forth in their entirety herein.

STATEMENT OF FEDERALLY SPONSORED RESEARCH OR DEVELOPMENT

Not applicable.

BACKGROUND

This disclosure relates to improvements to assemblies for cameras or other sensing units used in vehicles.

Many modern vehicles employ cameras or other sensors to help detect the presence of objects around the vehicle that are normally difficult for the driver to see. Perhaps the most common example of this is the backup camera that is found in many vehicles to help a driver see the area around the rear bumper to avoid backing the vehicle into an object or a person. Such a camera is particularly useful in large vehicles such as trucks or sport utility vehicles, in which the height of the vehicle from the ground as well as the presence of a tail gate or a rear door makes it particularly difficult to see behind the vehicle due to the size and geometry of the vehicle.

Traditional systems either (1) employ fixed cameras or sensors that are always directed at the same location relative to the surface on which the camera or sensor is mounted or (2) employ a stowed or hidden camera or sensor, in which the camera or sensor is temporarily deployed from a hidden position when the camera or sensor is placed into use. Such hidden cameras or sensors often have a cover that is pivoted to permit the camera or sensor to be moved into a specific use position and, when the camera or sensor is not in use, the camera or sensor may returned to the stowed position and re-covered.

SUMMARY OF THE INVENTION

In either of the traditional fixed or deployable camera or sensor arrangements, the camera or sensor has a single position in which it is designed to be used. In the case of the fixed camera or sensor, it is the position in which the fixed camera or fixed sensor is always positioned. In the case of the deployable camera or the deployable sensor, it is the deployed position in which the cover has been removed and/or the camera or sensor has been moved into position.

These prior assemblies are all premised on the fact that there is only a single use position that would be of interest to the driver. Typically, this use position would be the position in which the tailgate or rear door is in the closed position. This defines a single, non-changing field of view that, in the majority of situations, would be the field of view of most interest.

However, in many instances, this is an invalid assumption because the surface in or on which the camera or sensor is positioned may take a different configuration (that is, be movable) and the assumed field of view may be incorrect. For example, in a pickup truck, a backup camera on the tail gate may be configured to provide the appropriate field of view when the tail gate is up and latched in position, as this is the position of the tail gate in the majority of driving situations. Yet, it is not uncommon for the tailgate to be down in an unlatched position when a large, long, or oversized item is placed in the bed of the truck. In this instance, if the backup camera is attached to the tailgate and the tailgate is down, then this backup camera, which normally is designed to provide a single field of view when the tailgate is up, is rendered useless and non-functional as the camera is directed back towards the wheels of the vehicle. Accordingly, at a time when using the backup camera would be of particular interest to the driver, the backup camera fails in its essential purpose and a second person would be required to act as a spotter to ensure the driver does not inappropriately back into something.

Thus, there has been an unrecognized need for improved cameras and sensors that perform in a variety of usage conditions based on the positional state of the surface on which the camera or sensor is disposed or is mounted. A solution is disclosed herein that addresses the deficiencies present in current assemblies and vehicle configurations. Further, the rear camera or sensor may provide added functionality beyond providing a back-up field of view by also permitting repositioning of the camera or sensor in a plurality of alternative positions each having a field of view that is not necessarily associated with backing up the vehicle. Additional functionality may include, but is not limited to, providing a field of view including a towing ball and hitch for ease of positioning and securing a trailer to the vehicle, or providing an unobstructed rear field of view typically obtained from rear view mirrors for forward driving situations (that is, a camera positioned to have a field of view in which the camera faces substantially truly rearward, rather than rearward and substantially downward to capture the area only immediately behind the vehicle).

According to one aspect of the invention, an apparatus is disclosed for installation into a component of a vehicle in which the component is movable between a plurality of component positions relative to the vehicle. The apparatus includes a component position sensor and a sensing element. The component position sensor is for sensing a positional state of the component from one of the plurality of component positions that the component may have relative to the vehicle. The sensing element (which may be, for example, a camera or other sensor or sensing unit such as, for example, but not limited to, infrared sensors, lasers, Doppler sensors, radar, radio frequency sensors, microwave sensors, and/or optical sensors) is in communication with this component position sensor. The sensing element is adapted to be coupled to the component of the vehicle for movement relative to the component between a plurality of sensing element positions in order to define a plurality of fields of view. As used herein, "field of view" refers to any viewable or sensible field of a camera or sensor and is not strictly limited to a visual field of view in a video camera context. Each field of view corresponds to one of the plurality of sensing element positions. Based on the positional state of the component sensed by the component position sensor, the sensing element is actuated to one of the plurality of sensing element positions to provide the sensing element with a desired one of the plurality of fields of view.

The component position sensor may take a number of different forms. As some examples, the component position sensor may be an inclinometer which senses the positional orientation of the component using a gravity reference, a Hall effect sensor which detects the presence (or absence) of the component in proximity to some other feature of the vehicle (such as, for example, a frame or body component of the vehicle), or a latch sensor that establishes whether the component is latched to the vehicle. These are only some exemplary component position sensors and other types of sensors might also be used to detect the component position. It should be appreciated that one or more of each of these types of sensors might be used to detect component position as well as different combinations of different types of sensors and/or situations.

The sensing element may be actuated between the various sensing element positions in a number of ways. In one particular form, the sensing element may be adapted to pivot relative to the component between the various sensing element positions.

The apparatus may further include a controller that places the component position sensor and the sensing element in communication with one another. When the component position sensor and the sensing element are in communication with one another, the controller may be configured to receive a signal from the component position sensor indicating the positional state of the component. Based on this positional state, the controller may send a signal to the sensing element to actuate the sensing element to a sensing element position associated with the positional state of the component to provide the sensing element with a pre-established field of view selected from the plurality of fields of view.

According to another aspect of the invention, a vehicle is disclosed incorporating an apparatus of the type described above. The vehicle includes a component movable between a plurality of component positions relative to the vehicle. The vehicle further includes a component position sensor for sensing a positional state of the component from one of the plurality of component positions. The component position sensor is in communication with a sensing element. This sensing element is coupled to the component of the vehicle for movement relative to the component between a plurality of sensing element positions in order to define a plurality of fields of view in which each field of view corresponds to one of the plurality of sensing element positions. Based on the positional state of the component sensed by the component position sensor, the sensing element is actuated to one of the plurality of sensing element positions to provide the sensing element with a desired one of the plurality of fields of view.

As stated above, it is contemplated that this sensing element might be a camera or other type of sensing unit or sensor and that the component position sensor may include one or more of an inclinometer, a Hall effect sensor, a latch sensor, or other such sensing components.

In some forms, the component may be a rear door of the vehicle. In some forms, the component may be a deck lid, a tail gate, or other rear facing panel of the vehicle. In one specific form, the component may be a tail gate (as in a pick-up truck) in which the tail gate is hingedly attached to the vehicle and is movable between a first closed position in which the rear door is latched to the vehicle) and a second open position in which the rear door is unlatched from the vehicle and the tail gate is down.

Although the sensing element might be actuatable in a number of different ways, in one form, the sensing element may be pivotable relative to the component to move between the plurality of sensing element positions.

Still yet, in some forms, it is contemplated that one or more of the sensing element positions may provide a field of view for the sensing element that is a rear view similar to that of an unobstructed interior rear view mirror. In this way, the sensing element may effectively function as an improved rear view mirror without the obstructions traditionally found between the rearview mirror and the rear of the vehicle (such as, for example, passengers, seat backs, and so forth).

The vehicle may further include a controller placing the component position sensor and the sensing element in communication with one another. The controller may be configured to receive a signal from the component position sensor indicating the positional state of the component and may be configured to send a signal to the sensing element to actuate the sensing element to a sensing element position associated with the positional state of the component to provide the sensing element with a pre-established field of view selected from the plurality of fields of view. It is contemplated that this controller may also be in communication with one or more of a vehicle direction indicator (for example, a vehicle gear selector) or a user-activated control (for example, a physical button or touch screen control) in order to select a sensing element position in conjunction with the information from the component position sensor. As one example, the controller may be further configured to additionally receive a signal indicating a condition of a forward or rearward direction of travel of the vehicle and the controller may be configured to consider both the signal indicating the condition of the forward or rearward direction of travel of the vehicle and the signal from the component position sensor. Based on input from both of these signals, the controller may instruct the sensing element to be actuated to a sensing element position to provide the sensing element with a pre-established field of view selected from the plurality of fields of view.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 2A is rear perspective view of a pick-up truck having a tail gate in an up or latched position including an emblem incorporating an apparatus with a sensing element according to one aspect of the invention.

FIG. 2B is a detailed view of the emblem on the tailgate from FIG. 2A including the apparatus with the sensing element in which the sensing element is illustrated in a first primary position.

FIG. 3A is a rear perspective view of the vehicle from FIG. 2A in which the tail gate is in a down or unlatched position.

FIG. 3B is a detailed view of the emblem on the tailgate from FIG. 3A incorporating the apparatus with the sensing element in which the sensing element is illustrated in a second auxiliary position.

FIG. 4A has the tailgate in an upright (that, a closed position) with the camera extended out, while FIG. 4B has the tailgate in a lowered (that is, and opened position) with the camera extended out. In both views the camera is directed downwardly and rearwardly relative to the component of the vehicle.

DETAILED DESCRIPTION OF THE PREFERRED EMBODIMENTS

Figure 1:
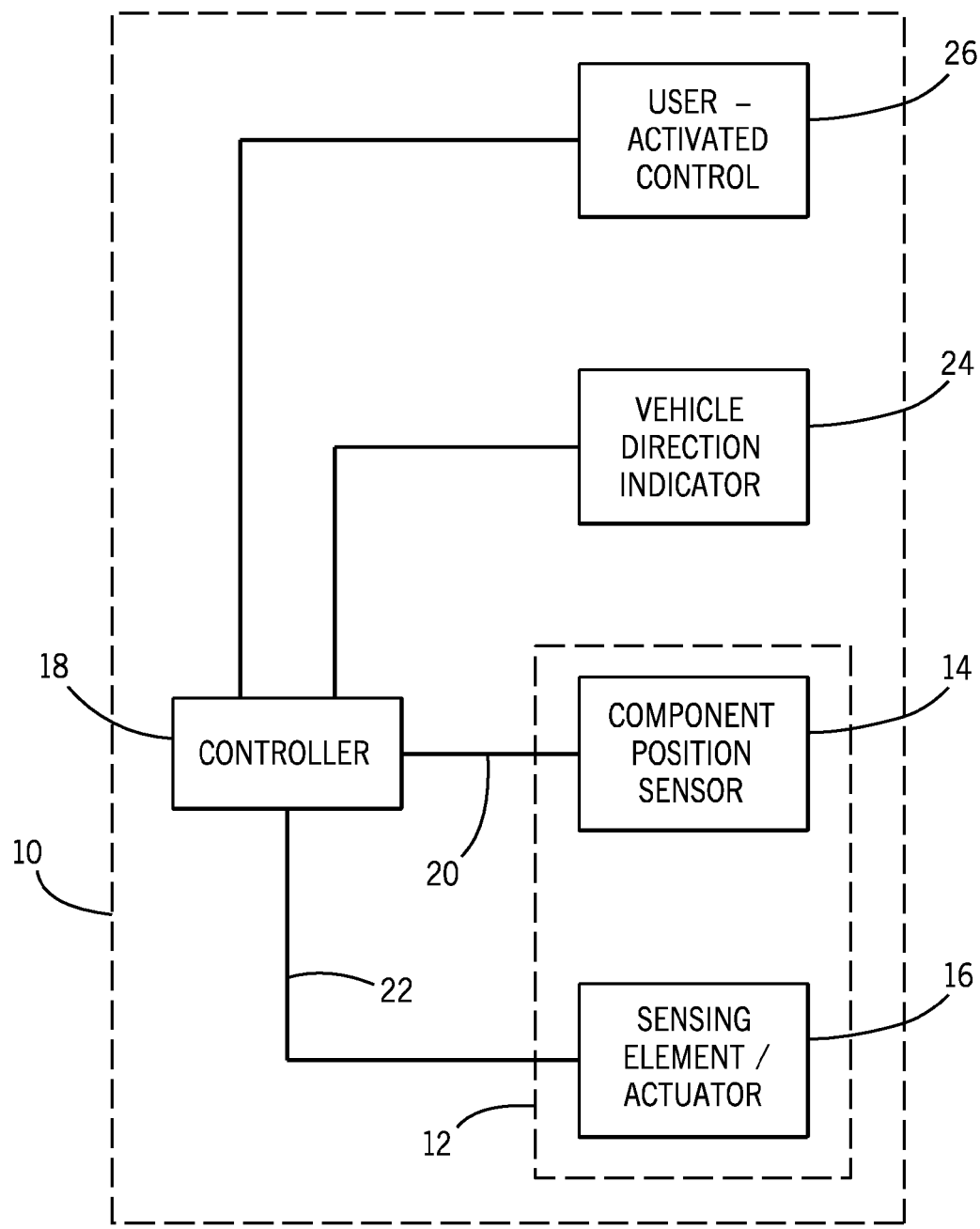
FIG. 1 is a schematic representation of a vehicle and its respective components and an associated apparatus incorporating a component position sensor and a sensing element according to one aspect of the invention.

Referring first to FIG. 1, a schematic representation of a vehicle 10 is illustrated according to one aspect of the invention. The vehicle 10 includes a number of components including a component 12, which is most commonly envisioned as a rear door or tail gate, although should not be limited thereto. When a rear door or tail gate, the component 12 is hingedly attached to the body or frame of the vehicle 10, such that the component 12 is movable between multiple component positions relative to the body or frame. For example, if the component 12 is a tail gate, it may be movable between an up, closed position in which the tail gate is latched to the body of the vehicle 10 to close the bed of the vehicle 10 and a down, open position in which the tail gate has been unlatched and dropped approximately 90 degrees to provide better access to the truck bed for loading and unloading.

As illustrated, the component 12 includes a component position sensor 14 and a sensing element 16. The sensing element 16 can also include an actuator that is used to adjust the position of the sensing element relative to the component 12.

The component position sensor 14 is a sensor that is adapted or configured to establish a position of the component 12 relative to the rest of the vehicle 10. As some non-limiting examples, the component position sensor 14 may be an inclinometer that determines the orientation of the component 12 with respect to gravity (which, unless the vehicle 10 is parked on a particularly steep incline, provides an accurate estimation of the position of the component 12 relative to the vehicle 10), a Hall effect sensor which measures output voltage to detect a change in a surrounding magnetic field (which may be altered by the presence or lack thereof an object near the sensor), or a latch sensor which detects whether or not a latch is engaged (for example, in a tail gate arrangement, if the tail gate is latched, then the tail gate is up whereas if the tail gate is not latched, then the tail gate is down). These represent only some of the types of component positional sensors and other types of sensors may also be used. Further, one or more than one sensor or type of sensor may be implemented to determine a positional state of the component 12 relative to the vehicle 10.

Additionally, it should be appreciated that while the component position sensor 14 is depicted as being part of or being contained within the component 12, that the component position sensor 14 may also be only partially in the component 12 or entirely outside of the component 12. For example, the component position sensor 14 might be housed in an area adjacent to or nearby the component 12 such as the adjacent frame or body component.

The sensing element 16 is movably coupled to the component 12 such that the relative position of the sensing element 16 can be adjusted relative to the component 12 to provide more than one exterior field of view from the sensing element 16. This might be done, for example, by pivoting the sensing element 16 relative to the component 12 using an actuator. However, other more complex linkage assemblies might be used and various types of actuation, whether mechanical, electrical, or electromechanical, might be used to enable such relative movement, actuation, or adjustment of the sensing element 16 relative to the component 12.

In some embodiments, this sensing element 16 is a camera unit, such as a backup camera. However, the sensing element 16 might also be another type of sensor. Moreover, it is contemplated that there may be more than one sensing element or types of sensing element and these sensing elements may be used together to form a composite image. For example, the sensing elements might include a camera and infrared sensor and the combined data may be used to form a composite image for the driver providing both visual and heat map data. As another example multiple sensing elements may be implemented at different positions to perform functions such as, for example, calculating the distance to an object. In any event, the sensing element 16 has a field of view based on its position relative to the component 12 as well as the position of the component 12 relative to the vehicle 10. By virtue of movement, actuation, or adjustment of the sensing element 16 between various predetermined and established sensing element positions as well as the position of the component 12, the field of view of the sensing element 16 can be changed.

Returning to FIG. 1, there is also a controller 18 which is placed in communication with the component position sensor 14 via a first connection line 20 and which is placed in communication with the sensing element 16 (and/or its actuator) via a second connection line 22. The controller 18 is configured to receive or read a signal provided by the component position sensor 14 that is representative of the position of the component 12 relative to the vehicle 10. The controller 18 receives this signal and processes it using pre-programmed logic in order to send a signal to the sensing element 16 (or its actuator) in order to change the position of the sensing element 16 in response to the position of the component 14. In short, the controller 18 establishes the position of the component 14 and then makes an appropriate positional adjustment to the sensing element 16 in order to provide a pre-determined field of view that might be most helpful to the user or driver.

This controller 18 might be a controller dedicated to just controlling the position of the sensing element 16 or might be a controller that performs various functions for the vehicle 10 in addition to controlling the position of the sensing element 16.

Additionally, it is contemplated that the controller 18 may receive input from more than just the component position sensor 14 in making a determination regarding the appropriate positional adjustment for the sensing element 16. Such additional input may also be used, either separately or in combination with the component position sensor 14, to establish a position of the sensing element 16. For example, the vehicle 10 may also have a vehicle direction indicator 24 which may be, for example, a vehicle gear selector or other means of assessing a state of operation of the vehicle to indicate whether the vehicle is (or is expected to) move forward or rearward. In such an instance, the controller 18 may incorporate more involved or complex logic to select an appropriate sensing element position. For example, if the vehicle direction indicator 24 indicates the vehicle 10 is moving forward (or is in a gear associated with forward movement), then the sensing element 16 might be actuated to a position in which field of view resembles a traditional rearview mirror for display to the driver (that is, the sensing element 16 or camera is directed to be angled in such a way that the center of the field of view is parallel to the ground). The particular position may also be influenced by the detected position of the component. Likewise, if the vehicle 10 is in park or in reverse, then the sensing element 16 may be actuated to a traditional position and orientation associated with a backup camera (that is, backwardly and downwardly) and, again, this position may also be at least partially determined by or associated with the position of the component 12 on which the sensing element 16 is mounted. Still yet, it is contemplated that there may be user-activated control 26 (for example, a button or touch screen control) that, when used, can be made to manually select the orientation of the sensing element 16 to select a user-desired field of view. For example, the user-activated control 26 might be used to have the driver indicate that he or she is interested in having the sensing element 16 directed to a tow hitch position in which the sensing element 16 is pointed towards the tow ball mount so that, when the vehicle is backed up, the driver can align the tow mount components. Further, the tow mount position of the sensing element 16 might be determined using a combination of the user-activated control 26 and the detected position of the component 12 on which the sensing element 16 is mounted (if, for example, the component on which the sensing element 16 is found is up or down).

With the general usage case having been outlined above, some specific embodiments are now described.

Referring now to FIGS. 2A, 2B, 3A, and 3B, one embodiment is illustrated for a pick-up truck 100 having a tail gate 102 providing access to a bed 104 of the pickup truck 100. On the rearward facing surface of the tail gate 102, an apparatus 106 is attached which is shown in greater detail in FIGS. 2B and 3B. This apparatus 106 includes a body 108 which is rigidly attached or mounted to the tailgate 102. Inside this body 108, there is a rotatable disc 110 that is rotatably mounted to the body 108. The rotatable disc 110 may display an emblem on a face thereof (for example, the name of the vehicle or component manufacturer) and has a sensing element 112 mounted therein or thereon which has a field of view (FOV) that is generally depicted by the emanating lines from the apparatus 106 or the sensing element 112 in the figures.

As illustrated in FIG. 2A, when the tail gate 102 is in the up or latched position then, as illustrated in FIG. 2B, the rotatable disc 110 is flush with the surface of the body 108. As illustrated in FIG. 3A, when the tail gate 102 is dropped down and when a component position sensor establishes that the tailgate is down, then the rotatable disc 110 is made to rotate to a position within the body 108 and relative to the tail gate 102 as depicted in FIG. 3B, thereby altering the field of view of the sensing element 112 relative to the tail gate 102. In this way, the sensing element 112, which may be, for example, a backup camera, can continue to provide a desired field of view (down and back behind the pick-up truck 100), even though the tail gate 102 has been changed between two positions. Notably, these two fields of view are similar, but not identical as the sensing element 112 will change in relative height and location relative to the bed. In contrast, if the backup camera was rigidly fixed and the tail gate was dropped to the open position, then the field of view for the camera would be back towards the tires underneath the rear of the vehicle, which would not be a particularly useful view to the driver.

Figure 4A:
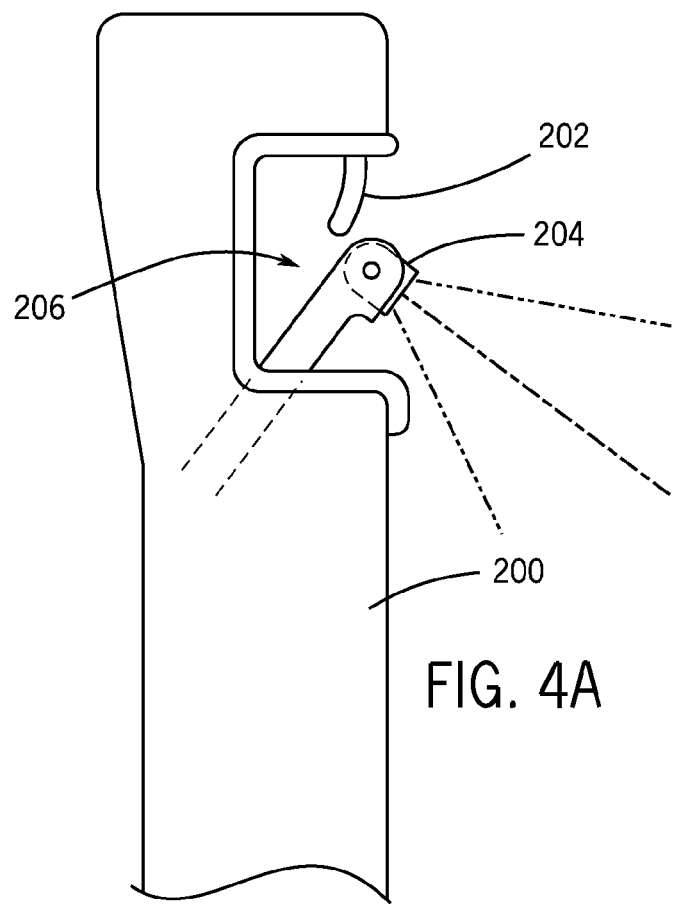
FIGS. 4A and 4B are view of an alternative embodiment in which a tail gate for a truck has an extendable camera that is able to extend through the space for user operation of a handle.
Figure 4B:
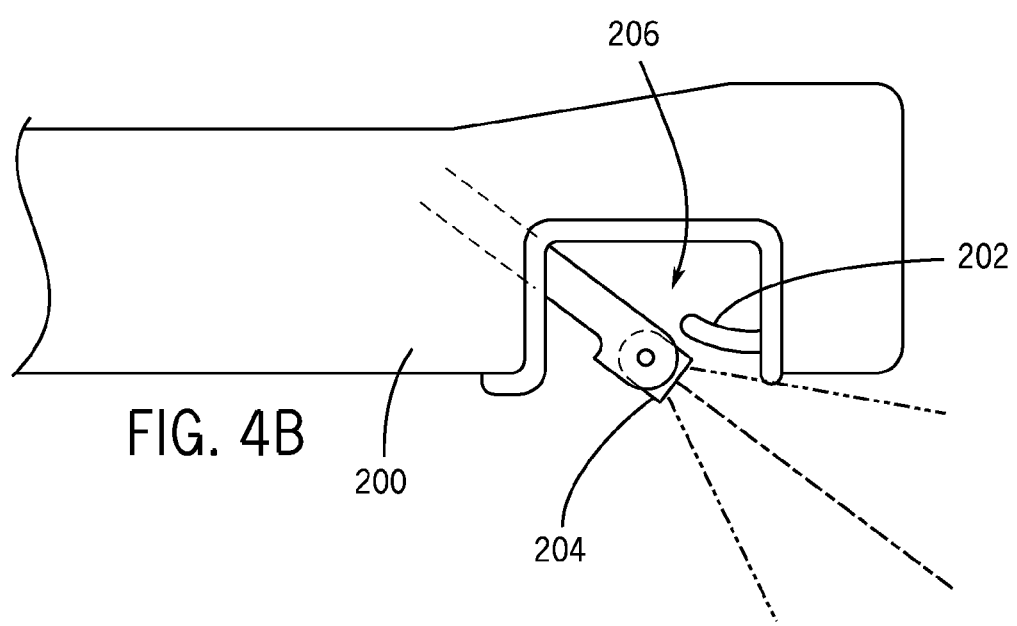

Referring now to FIGS. 4A and 4B, an alternative form of a tail gate 200 is illustrated. In this form, there is a handle assembly 202 that can be actuated in order to unlatch the tail gate 200 when it is opened. An extendable camera assembly 204 is extendable into the space 206 where a user's hand would enter to grasp and lift the handle assembly 202. In both views, the extendable camera assembly 204 has been extended into this space 206 and it may be retracted when the camera assembly 204 is not in use.

Comparing FIGS. 4A and 4B, it can be seen that the tail gate 200 is in an up and a down position, respectively, and that the camera at the end of the camera assembly 204 has been pivoted to alter the field of view based on the sensed position of the tail gate in the various positions. In FIG. 4A, the camera points approximately 45 degrees downward from horizontal in order to provide the field of view generally indicated by the field of view lines. In FIG. 4B, the tailgate 200 has been rotated 90 degrees clockwise, while the camera of the camera assembly has been rotated or pivoted approximately 90 degrees counter-clockwise to adjust the field of view such that it is again approximately 45 degrees downward from horizontal. While the field of views between the two positions are somewhat similar in character in that they both have a field of view in the downward and rearward direction, they are not identical as the height of the camera in the tail gate 200 is altered when the tail gate 200 is swung down.

Figure 5A:
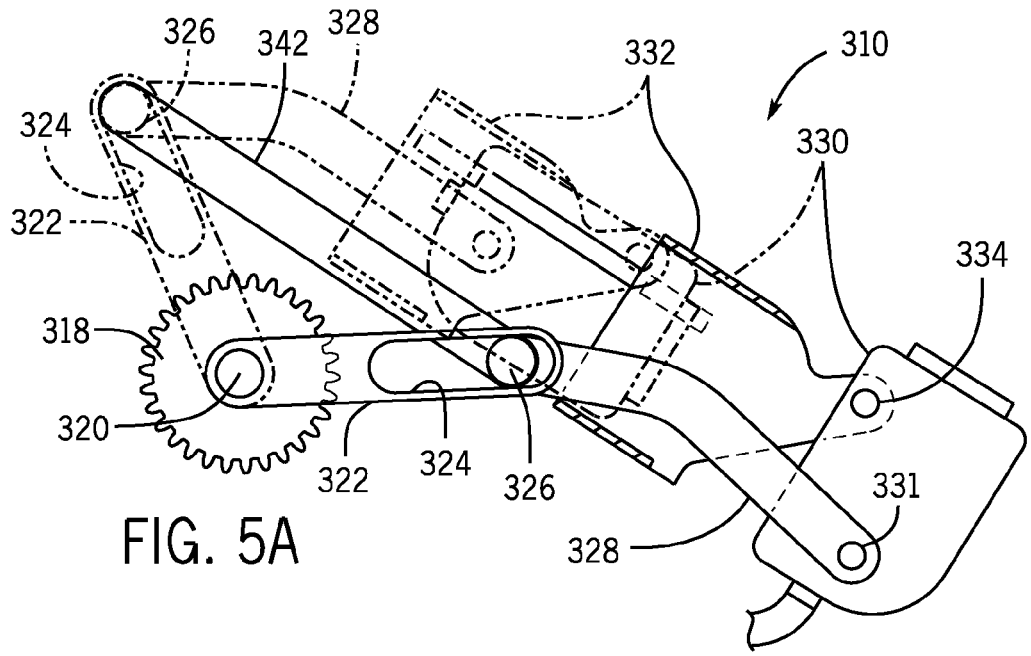
FIGS. 5A through 5D illustrate an extendable camera assembly that extends based on a tail gate position.
Figure 5B:
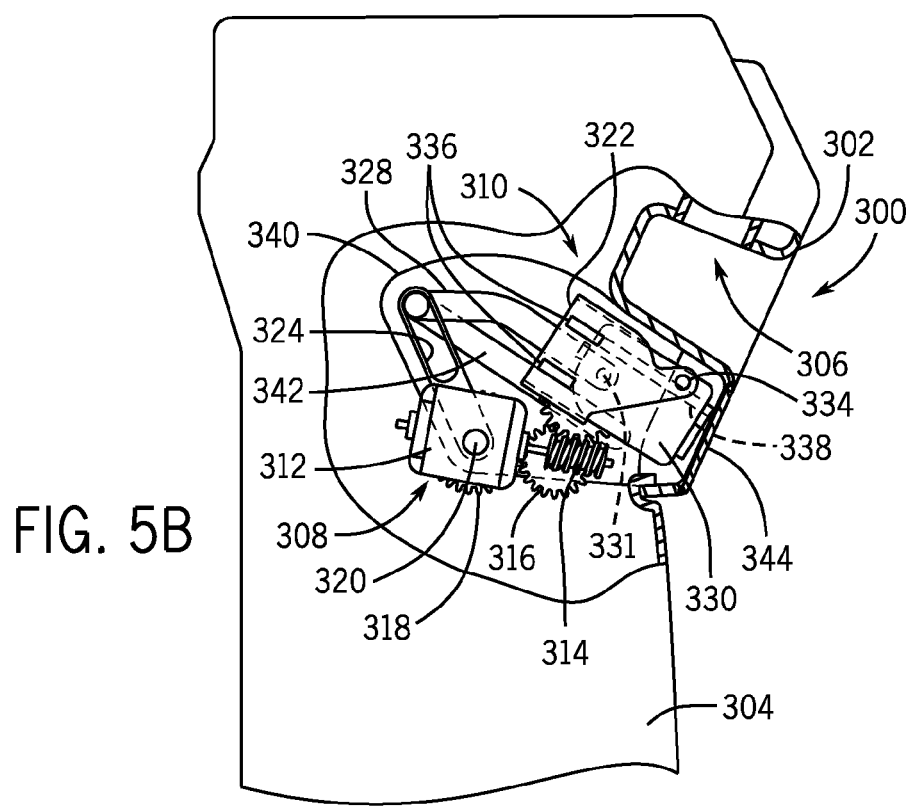
Figure 5C:
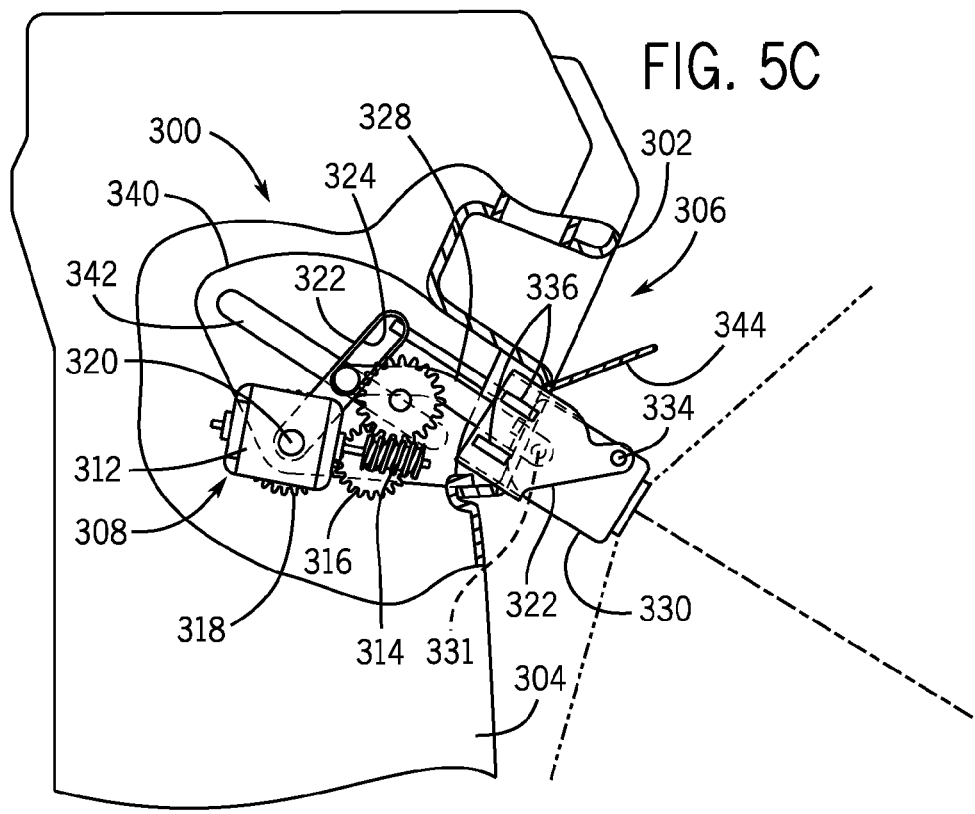
Figure 5D:
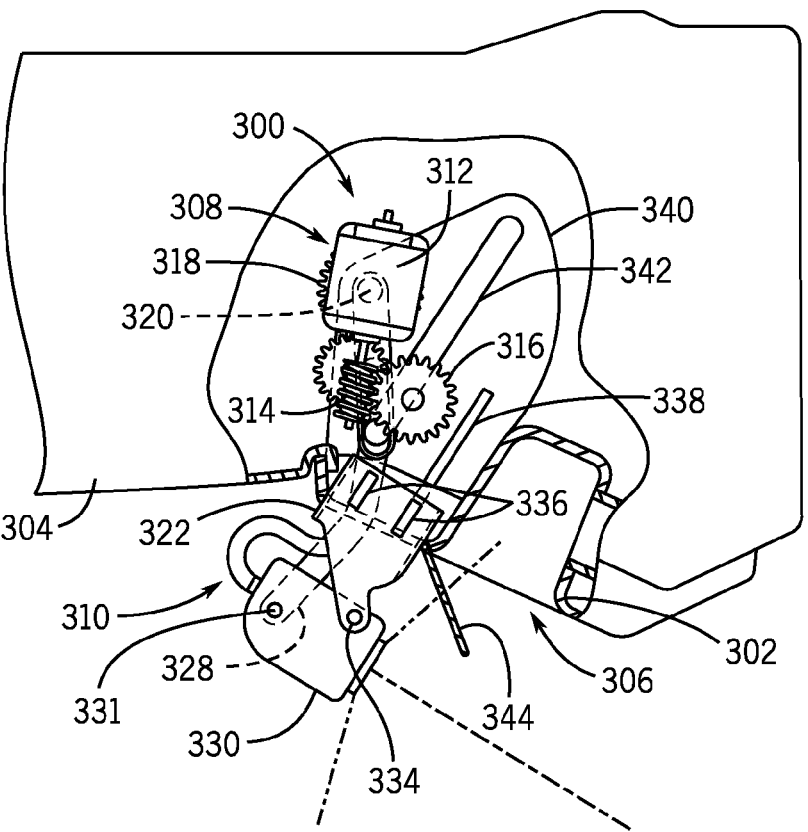

Turning now to FIGS. 5A through 5D, yet another embodiment is illustrated incorporating an extendable camera assembly 300 in the region of a latch 302 on a tailgate 304 of a vehicle. As best illustrated in FIGS. 5B through 5D, the extendable camera assembly 300 is positioned in the tailgate 304 just below the recessed region 306 above the latch 302 which also normally receives the fingers of the user when the latch 302 is to be pulled to open the tailgate 304.

FIG. 5A illustrates a portion of the extendable camera assembly 300 in the fully retracted position (in phantom) and is further shown in FIG. 5B and in a fully extended position (in solid lines) as is further shown in FIG. 5C. However, it will be appreciated that FIG. 5A only illustrates an actuatable extension portion 310 of the assembly 300 as well as some of the slots of a surrounding housing which delimit the range of motion of the components of this portion. FIG. 5A shows some of the components without these components being concealed behind other components of the driving portion (such as the motor and gear train) as they are in the views of FIGS. 5B through 5D. The components described below, but not illustrated in FIG. 5A, can be found in FIGS. 5B through 5D which illustrate broken away views of the extendable camera assembly 300 in the tailgate 304.

Because the extendable camera assembly 300 has many components, it may be easiest to conceptualize the extendable camera assembly 300 as being generally divided into two segments. The first segment is the driving portion 308 (best illustrated in FIGS. 5B through 5D) which is controlled by the controller and the second segment is the actuatable extension portion 310 (which is also shown in FIGS. 5B through 5D, as well as detailed in FIG. 5A) which is selectively driven or actuated by the driving portion 308 to extend or retract the sensing element or camera. The driving portion 308 may include an electric motor 312, such as a stepper motor, which drives a worm gear 314 which, in turn, drives a gear train 316. The gear train 316 ultimately connects to a gear 318 which is connected to an end on an axle 320, which conceptually begins the actuated extension portion 310.

Proximate the two ends of the axle 320, there are two spaced radially extending arms 322 which each have a slot 324 formed therein. Through these slots 324, a shaft 326 is received. The shaft 326 is generally parallel with the axle 320 and the outer cylindrical surface of the shaft 326 bears on the surfaces of the slots 324 such that the shaft 326 can be repositioned in the slots 324 or slide therethrough. At each of the ends of the shaft 326, one of a pair of connecting linkages 328 are connected. These connecting linkages 328 pivotally connect the shaft 326 to the lateral sides of a sensing element 330 at 331, which in the form illustrated is a camera. In addition to being connected to the pair of connecting linkages 328, this sensing element 330 is also rotatably connected to a translatable carriage 332 at which point of rotatable connection an axis of rotation 334 for the sensing element 330 relative to the carriage 332 is defined or established. In the particular form illustrated, the translatable carriage 332 also has a pair of projections 336 that are received in slots 338 formed in the lateral walls of a housing 340 that, generally speaking, contains the actuated extension portion 310 when the sensing element 330 is in the retracted position illustrated in FIG. 5B. The engagement of the projections 336 and the slots 338 define a potential range of translational movement for the carriage 332 relative to the housing 340. The housing 340 also has another pair of slots 342 in its lateral walls which are parallel with the direction of translational movement of the carriage 332 through which the ends of the shaft 326 are received. Notably, this means that the shaft 326 connects to the connecting linkages 328, extends through the slots 324 of the radially extending arms 322 and bears thereon, and also extends through the slots 342 in the lateral walls of the housing 340 and bears thereon.

With this structure having been described, three different positions for this extendable camera assembly 300 are shown across FIGS. 5B through 5D.

In FIG. 5B, the tailgate 304 is shown in the upright or latched position and the sensing element 330 of the extendable camera assembly 300 is illustrated in a retracted position in which the sensing element 330 fully retracted into the tailgate 304. In this retracted position and with frame of reference being made with respect to the illustration on the page, the motor 312 has driven the gear 318 and attached radially extending arms 322 as far counter-clockwise as the slotted engagement of the shaft 326 with the slots 324 and 326 will permit. This effectively causes the linkages 328 to translate the carriage 332 leftward such that the sensing element 330 is completely received in the housing 340 in the tailgate 304. In this position, a flap 344 covers an opening 346 in the wall of the tailgate through which the sensing element 330 is extendable in order to fully conceal and potentially protect the sensing element 330.

Now with reference to FIG. 5C, the tailgate 304 is again illustrated in the upright position, but now a controller has instructed the motor 312 to extend the sensing element 330 out of the tailgate 304 to a first extended position at which a first field of view is established (the field of view being generally indicated by the dotted lines emanating from the sensing element 330). To extend the sensing element 330 into this first extended position, the motor 312 is run to actuate the gear 318 clockwise from the position illustrated in FIG. 5B until the radially extending arms 322 have the angular position indicated in FIG. 5C. Alternatively, if the arms 322 start in the position in FIG. 5D, the motor 312 is instructed to drive the gear 318 counter-clockwise until the arms 322 have the angular position indicated in FIG. 5B. At this angular position of the arms 322, the shaft 326 is located at the intersection of the slots 324 and 342. This causes the linkages 328 to translate the carriage 332 to the position illustrated in FIG. 5C (as the projections 336 and corresponding slots 338 guide the motion of the carriage 332) in which the sensing element 330 is made to push the flap 344 up and extend out of the tailgate 304.

Then, as illustrated in FIG. 5D, once the carriage 322 is in the position illustrated in FIG. 5C, further extension of the extendable camera assembly 300 will result in the counter-clockwise rotation of the sensing element 330 relative to the carriage 332. This is because, once the carriage 332 is shifted as far forward as it can go based on the limitations of the projections 336 and corresponding slots 338, any further clockwise rotation of the gear 318 and arms 322 will not cause the forward extension of the carriage 332 but rather will now cause the pivoting of the sensing element 330 about the axis of rotation 334 since the linkages 328 will continue to drive the sensing element 330 and the point of connection 331 between the linkages 328 and the sensing element 330 is offset from the axis of rotation 334 for the sensing element 330. Accordingly, when the tailgate 304 is moved to an opened position, as is illustrated in FIG. 5D, the sensing element 330 can be driven to a second extended position at which a second field of view (again, indicated by the emanating lines) is established.

As will be readily appreciated, these three positions in FIGS. 5B through 5D can be reached using the methods, logic, and controller described above. Thus, for example, based on a component position sensor (and optionally a user-activated control, vehicle direction indicator or other sensors), the motor 312 can be driven such that the various positions of the sensing element 330 are achieved.

In sum, a device has been disclosed whereby a camera or sensor type apparatus is positioned based on inputs relating to the desired field of vision or sensing. As depicted in this disclosure a device such as an inclinometer, hall sensing apparatus, latch ratchet position sensor, a controller identifying gate or sensor housing relative to the overall vehicle, and so forth, in combination or singularly identifies the position of the camera or sensor housing versus a desired field of view or sensing field. This information is then used to determine the positional rotation, translation or combination of both to allow the achievement of the desired viewing or sensing field for the assessed functionality.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. An apparatus for installation into a component of a vehicle in which the component is movable between a plurality of component positions relative to the vehicle, the apparatus comprising:
   a component position sensor for sensing a positional state of the component from one of the plurality of component positions;
   a sensing element in communication with the component position sensor and adapted to be coupled to the component of the vehicle for movement relative to the component between a plurality of sensing element positions in order to define a plurality of fields of view in which each field of view corresponds to one of the plurality of sensing element positions;
   an arm pivotally supported for rotation relative to the component; and
   a linkage pivotally coupled to the sensing element and pivotally and translatably coupled to the arm;
   wherein, based on the positional state of the component sensed by the component position sensor, the sensing element is actuated relative to the component to one of the plurality of sensing element positions to provide the sensing element with a desired one of the plurality of fields of view.

2. The apparatus of claim 1, wherein the sensing element is a camera.

3. The apparatus of claim 1, wherein the sensing element is a sensor selected from the group consisting of infrared sensors, lasers, Doppler sensors, radar, radio frequency sensors, microwave sensors, and optical sensors.

4. The apparatus of claim 1, wherein the component position sensor includes an inclinometer.

5. The apparatus of claim 1, wherein the component position sensor includes a Hall sensor.

6. The apparatus of claim 1, wherein the component position sensor includes a latch sensor that establishes whether the component is latched to the vehicle.

7. The apparatus of claim 1, wherein the component position sensor for sensing a positional state of the component from one of the plurality of component positions includes a plurality of component position sensors.

8. The apparatus of claim 1, wherein the sensing element is adapted to pivot relative to the component between the plurality of sensing element positions.

9. The apparatus of claim 1, further comprising a controller placing the component position sensor and the sensing element in communication with one another in which the controller is configured to receive a signal from the component position sensor indicating the positional state of the component and to send a signal to the sensing element to actuate the sensing element to a sensing element position associated with the positional state of the component to provide the sensing element with a pre-established field of view selected from the plurality of fields of view.

10. A vehicle comprising:
a component movable between a plurality of component positions relative to the vehicle;
a component position sensor for sensing a positional state of the component from one of the plurality of component positions;
a sensing element in communication with the component position sensor and coupled to the component of the vehicle for movement relative to the component between a plurality of sensing element positions in order to define a plurality of fields of view in which each field of view corresponds to one of the plurality of sensing element positions;
an arm pivotally supported for rotation relative to the component; and
a linkage pivotally coupled to the sensing element and pivotally and translatably coupled to the arm;
wherein, based on the positional state of the component sensed by the component position sensor, the sensing element is actuated relative to the component to one of the plurality of sensing element positions to provide the sensing element with a desired one of the plurality of fields of view.

11. The vehicle of claim 10, wherein the sensing element is a camera.

12. The vehicle of claim 10, wherein the sensing element is a sensor selected from the group consisting of infrared sensors, lasers, Doppler sensors, radar, radio frequency sensors, microwave sensors, and optical sensors.

13. The vehicle of claim 10, wherein the component is a rear door of the vehicle.

14. The vehicle of claim 10, wherein the component is a tail gate hingedly attached to the vehicle and is movable between a first closed position in which the tail gate is latched to the vehicle and a second open position in which the tail gate is unlatched from the vehicle and the tail gate is down.

15. The vehicle of claim 10, wherein the component position sensor includes an inclinometer.

16. The vehicle of claim 10, wherein the component position sensor includes a Hall sensor.

17. The vehicle of claim 10, wherein the component position sensor includes a latch sensor that establishes whether the component is latched to the vehicle.

18. The vehicle of claim 10, wherein the component position sensor for sensing a positional state of the component from one of the plurality of component positions includes a plurality of component position sensors.

19. The vehicle of claim 10, wherein the sensing element is pivotable relative to the component to move between the plurality of sensing element positions.

20. The vehicle of claim 10, further comprising a controller placing the component position sensor and the sensing element in communication with one another in which the controller is configured to receive a signal from the component position sensor indicating the positional state of the component and configured to send a signal to the sensing element to actuate the sensing element to a sensing element position associated with the positional state of the component to provide the sensing element with a pre-established field of view selected from the plurality of fields of view.

21. The vehicle of claim 20, wherein the controller is further configured to additionally receive a signal indicating a condition of a forward or rearward direction of travel of the vehicle and the controller is configured to consider both the signal indicating the condition of the forward or rearward direction of travel of the vehicle and the signal from the component position sensor and, based on input from both of these signals, to actuate the sensing element to a sensing element position to provide the sensing element with a pre-established field of view selected from the plurality of fields of view.

22. The vehicle of claim 10, wherein the component is a rear door, deck lid, tail gate, or other rear facing panel of the vehicle.

23. The vehicle of claim 10, wherein one of the sensing element positions provides a field of view for the sensing element that is a rear view similar to that of an unobstructed interior rear view mirror.

24. The apparatus of claim 1, wherein the arm defines a first slot, the apparatus further comprising a shaft coupled to the linkage and pivotally and translatably disposed within the first slot.

25. The vehicle of claim 10, wherein the arm defines a first slot, the vehicle further comprising a shaft coupled to the linkage and pivotally and translatably disposed within the first slot.

26. The apparatus of claim 1, further comprising:
a translatable carriage pivotally coupled to the sensing element and including a projection; and
a housing configured to receive the sensing element and defining a slot, wherein the projection is translatably disposed within the slot.

27. The vehicle of claim 10, further comprising:
a translatable carriage pivotally coupled to the sensing element and including a projection; and
a housing configured to receive the sensing element and defining a slot, wherein the projection is translatably disposed within the slot.

28. The apparatus of claim 24, further comprising a housing configured to receive the sensing element and defining a second slot, wherein the shaft is translatably disposed within the second slot.

29. The vehicle of claim 25, further comprising a housing configured to receive the sensing element and defining a second slot, wherein the shaft is translatably disposed within the second slot.

\* \* \* \* \*